(12) United States Patent
Jobson et al.

(10) Patent No.: US 8,111,943 B2
(45) Date of Patent: Feb. 7, 2012

(54) SMART IMAGE ENHANCEMENT PROCESS

(75) Inventors: Daniel J. Jobson, Newport News, VA (US); Zia-ur Rahman, Williamsburg, VA (US); Glenn A. Woodell, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 517 days.

(21) Appl. No.: 12/423,907

(22) Filed: Apr. 15, 2009

(65) Prior Publication Data

US 2010/0266214 A1   Oct. 21, 2010

(51) Int. Cl.
*G06K 9/40*   (2006.01)
(52) U.S. Cl. ........ 382/274; 382/275; 382/206; 382/224; 382/260; 382/283
(58) Field of Classification Search .......... 382/274, 382/275, 206, 224, 260, 283
See application file for complete search history.

(56) References Cited

U.S. PATENT DOCUMENTS

| | | | |
|---|---|---|---|
| 5,287,176 A | 2/1994 | Stolle et al. | |
| 5,841,911 A * | 11/1998 | Kopeika et al. | 382/254 |
| 5,991,456 A | 11/1999 | Rahman et al. | |
| 6,205,257 B1 | 3/2001 | Eschbach | |
| 6,842,543 B2 | 1/2005 | Woodell et al. | |
| 6,843,125 B2 | 1/2005 | Peterson et al. | |
| 6,909,815 B2 * | 6/2005 | Bernstein et al. | 382/274 |
| 7,013,025 B2 | 3/2006 | Hiramatsu | |
| 7,099,520 B2 | 8/2006 | Ishiguro | |
| 7,136,508 B2 | 11/2006 | Asano et al. | |
| 7,170,645 B2 | 1/2007 | Kim et al. | |
| 7,187,808 B2 | 3/2007 | Cho et al. | |
| 7,209,183 B2 | 4/2007 | Kim | |
| 7,283,683 B1 | 10/2007 | Nakamura et al. | |
| 7,308,154 B1 | 12/2007 | Ferrante et al. | |
| 7,315,656 B2 | 1/2008 | Von Thal et al. | |
| 7,352,410 B2 | 4/2008 | Chou | |
| 2004/0136605 A1 | 7/2004 | Seger et al. | |
| 2005/0123211 A1 | 6/2005 | Wong et al. | |

(Continued)

OTHER PUBLICATIONS

Narasimhan et al, "Contrast Restoration of Weather Degraded Images", IEEE 2003.*

(Continued)

*Primary Examiner* — Wesley Tucker
*Assistant Examiner* — Mark Roz
(74) *Attorney, Agent, or Firm* — Andrea Z. Warmbier; Robin W. Edwards

(57) ABSTRACT

Contrast and lightness measures are used to first classify the image as being one of non-turbid and turbid. If turbid, the original image is enhanced to generate a first enhanced image. If non-turbid, the original image is classified in terms of a merged contrast/lightness score based on the contrast and lightness measures. The non-turbid image is enhanced to generate a second enhanced image when a poor contrast/lightness score is associated therewith. When the second enhanced image has a poor contrast/lightness score associated therewith, this image is enhanced to generate a third enhanced image. A sharpness measure is computed for one image that is selected from (i) the non-turbid image, (ii) the first enhanced image, (iii) the second enhanced image when a good contrast/lightness score is associated therewith, and (iv) the third enhanced image. If the selected image is not-sharp, it is sharpened to generate a sharpened image. The final image is selected from the selected image and the sharpened image.

9 Claims, 3 Drawing Sheets

U.S. PATENT DOCUMENTS

| | | |
|---|---|---|
| 2005/0163393 A1 | 7/2005 | Asari |
| 2006/0092474 A1 | 5/2006 | Ramsay et al. |
| 2006/0126959 A1 | 6/2006 | Padwick et al. |
| 2006/0216959 A1 | 6/2006 | Padwick et al. |
| 2006/0245647 A1 | 11/2006 | Lee |
| 2006/0268180 A1 | 11/2006 | Chou |
| 2007/0009167 A1 | 1/2007 | Dance et al. |
| 2007/0172121 A1* | 7/2007 | Masaki .................. 382/170 |
| 2007/0172145 A1 | 7/2007 | Altunbasak et al. |
| 2007/0201763 A1 | 8/2007 | Kuwata et al. |
| 2007/0217707 A1 | 9/2007 | Lin et al. |
| 2007/0223814 A1 | 9/2007 | Chang et al. |
| 2007/0286522 A1 | 12/2007 | Moessle |
| 2008/0044083 A1 | 2/2008 | Bilcu et al. |
| 2008/0050031 A1 | 2/2008 | Itoh et al. |

OTHER PUBLICATIONS

Narasimhan et al, "Vision and the Atmosphere", IJCV 2002.*

Mahiny et al, "A Comparison of Four Common Atmospheric Correction Methods", Photogrammetric Engineering and Remote Sensing, 2007.*

* cited by examiner

SMART IMAGE ENHANCEMENT PROCESS

ORIGIN OF THE INVENTION

This invention was made in part by employees of the United States Government and may be manufactured and used by or for the Government of the United States of America for governmental purposes without the payment of any royalties thereon or therefor.

BACKGROUND OF THE INVENTION

1. Field of the Invention

This invention relates to digital image processing. More specifically, the invention is a method for optimizing the visual quality of any digital image based on contrast, lightness and sharpness measures thereof.

2. Description of the Related Art

The image of a scene captured by imaging equipment is affected by the environments between the imaging equipment and the scene. For example, if the environment is a low-light environment, image features can be lost due to flow contrast and low lightness. If the environment is turbid (e.g., foggy, smoke, rain, snow, murky water, etc.), there is very little contrast in an image. The combination or low light and a turbid environment makes image feature detection even more difficult.

Conventional image processing approaches are typically designed to cope with one of these environments but not the effects caused by combinations of these environments. Further, conventional image processing approaches are either manual methods or passive automatic image enhancement methods that do not evaluate and adapt to visual qualities. The manual methods require significant operator training, are time consuming and expensive, and/or are inconvenient for some applications. Existing automatic methods include auto level enhancement, histogram enhancement, and retinex image processing as disclosed in U.S. Pat. Nos. 5,991,456, 6,834,125 and 6,842,543.

Auto level or "fixed gain" enhancement does not work with wide dynamic range images as saturation occurs. Histogram enhancement performance is unpredictable. Retinex image processing performs relatively well in terms of contrast and lightness enhancement across wide ranging imaging conditions. However, the effectiveness of retinex image processing is reduced for narrow dynamic range images generated in low-light or turbid environments. Finally, each of the automatic enhancement approaches operates on all images even when some images are visually acceptable. From a processing cost perspective, this is inefficient.

SUMMARY OF THE INVENTION

Accordingly, it is an object of the present invention to provide a method of image processing that effectively and efficiently enhances images that are unsatisfactory.

Another object of the present invention is to provide an automatic method of image enhancement.

Still another object of the present invention is to provide an image enhancement method that achieves pattern constancy for a variety of low light, low-contrast, and/or turbid imaging environments.

Other objects and advantages of the present invention will become more obvious hereinafter in the specification and drawings.

In accordance with the present invention, a method of smart image processing is provided. Contrast and lightness measures are computed for a digital image and used to first classify the image as being one of non-turbid and turbid. If a turbid image, the original image is enhanced to generate a first enhanced image. If a non-turbid image, the original image is then classified as having one of a good contrast/lightness score and a poor contrast/lightness score based on the contrast and lightness measures. The non-turbid image is enhanced when a poor contrast/lightness score is associated therewith. As a result, a second enhanced image is generated. A revised contrast measure and revised lightness measure are computed for the second enhanced image. This second enhanced image is then classified as having one of a good contrast/lightness score and a poor contrast/lightness score based on the revised contrast and lightness measures. When the second enhanced image has a poor contrast/lightness score associated therewith, this image is enhanced so that a third enhanced image is generated. A sharpness measure is computed for one image that is selected from (i) the non-turbid image, the first enhanced image, (iii) the second enhanced image when a good contrast/lightness score is associated therewith, and (iv) the third enhanced image. This selected image is then classified as having one of a sharp image score and a not-sharp image score based on the sharpness measure. The selected image having a not-sharp score associated therewith is then sharpened to generate a sharpened image. A contrast measure and revised sharpness measure are then computed for the sharpened image. The sharpened image is classified as having one of a sharp image score and a not-sharp image score based on the contrast measure associated with the sharpened image. The final image is selected from (i) the selected image having the sharp image score, (ii) the sharpened image having the sharp image score, and, in some instances, (iii) the sharpened image having the not-sharp image score.

DETAILED DESCRIPTION OF THE INVENTION

Figure 1:
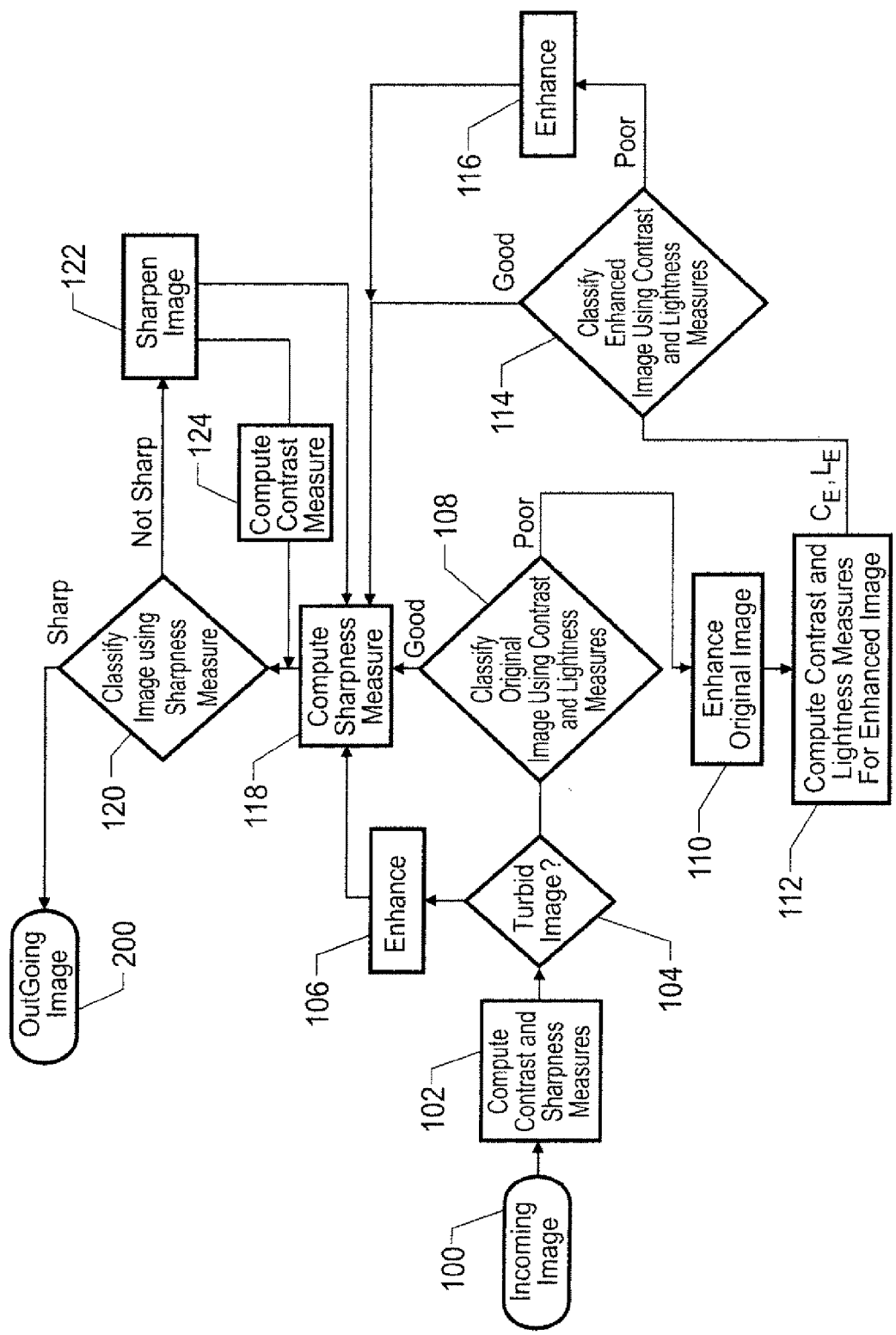
FIG. 1 is a flow diagram of an image processing method in accordance with the present invention.

Referring now to the drawings and more particularly to FIG. 1, a flow diagram of an image processing method in accordance with the present invention is shown. The method operates on digital image data that can be captured by digital imaging equipment, or analog imaging equipment coupled to an analog-to-digital converter. Accordingly, the choice of imaging equipment is not a limitation of the present invention. In addition, the digital image data processed in accordance with the present invention can be a single still image or a single frame from a video data stream. Still further, the method described herein can be applied as post-processing to archived image data, or can be incorporated into imaging equipment to provide real-time image (i.e., still or video image) enhancement.

In accordance with the present invention, a raw incoming image 100 in digital form will be provided. Image 100 is a single frame of an image and is defined by an N×M array of pixels with each pixel having an intensity value associated therewith as would be well understood in the art. As mentioned above, image 100 can be a still image or a single frame from a video stream as processing will be the same in either case. In general, image 100 will be evaluated in accordance with a number of novel "measures" of visual quality, and then enhanced (if necessary) predicated on the computed measures. The process is automatic and adapts to all imaging environments. Thus, the present invention can be viewed as a "visual servo control" process.

The first measures are computed for image 100 at step 102. These first measures are a contrast measure "C" and lightness measure "L". While the determination of these measures will be described further below, it is sufficient at this point in the description to say that these two measures define the contrast and lightness of image 100 relative to predetermined/acceptable criteria.

Image 100 is then evaluated in terms of its turbidity at step 104. In general and as referred to herein, a "turbid" image is one exhibiting low contrast due to (i) image environment conditions such as fog, haze, smoke, rain, snow, cloudy or muddy water, etc., that cloud the medium between the scene and the imaging device, (ii) insufficient light at the time of image capture as is the case during the low-light times of dawn or dusk, or (iii) severe underexposure errors during image acquisition.

Step 104 utilizes the computations of step 102 to perform one or more evaluations of image 100 to determine if image 100 is a turbid image. If image 100 is determined to be turbid, the image is enhanced at step 106. Details of turbid-image determination step 104 and an exemplary enhancement process 106 will be described in detail further below. If generated, the enhanced turbid image is supplied to a sharpness measure computation step 118.

If image 100 is not turbid, processing of image 100 proceeds to step 108 where a merged contrast and lightness classification is performed using contrast measure C and lightness measure L. At this point in the description, it is sufficient to say that step 108 classifies image 100 as being either GOOD or POOR in terms of the present invention's merged contrast/lightness evaluation that will be described further below. If image 100 is classified as GOOD, image 100 is provided to sharpness measure computation step 118.

If image 100 is classified as being POOR in terms of its contrast/lightness evaluation, then image 100 is enhanced at step 110. For example, enhancement step 110 can utilize retinex processing techniques disclosed by one or more of U.S. Pat. Nos. 5,991,456, 6,334,125 and 6,842,543, the contents of which are each hereby incorporated by reference in their entirety. Should enhancement step 110 utilize the processing techniques disclosed by all three of these patents, enhancement step 110 is said to employ a "multi-scale retinex with color restoration" (MSRCR) process as it is known in the art. However, it is also to be understood that step 110 is not limited to the MSRCR process as other or additional image enhancement techniques could be used without departing from the scope of the present invention.

The resulting enhanced image from step 110 is re-evaluated in terms of contrast and lightness. More specifically, the enhanced image from step 110 has contrast and lightness measures associated therewith computed at step 112 where such computations are the same ones used in step 102. The computed contrast measure "$C_E$" and lightness measure "$L_E$" for the enhanced image are then utilized in a merged fashion by classification step 114. Classification determination processing at step 114 is the same as that performed at step 108. As a result of step 114, the enhanced image from step 110 is classified as being either GOOD or POOR in terms of the present invention's merged contrast/lightness evaluation.

If step 114 classifies the enhanced image as POOR, the enhanced image (from step 110) is further enhanced (e.g., by auto level processing, histogram modification, etc.) at step 116. One of the enhanced image classified as GOOD or the re-enhanced image from step 116 is provided to a sharpness measure computation step 118.

As a result of the above-described processing, one "image" is provided to step 118 for computation of a sharpness measure associated therewith. The image provided to step 118 can be the original image 100 (i.e., a GOOD classification from step 108), an enhanced turbid image from step 106, an enhanced original image classified as GOOD at step 114, or a re-enhanced image from step 116. Regardless of the "image" provided thereto, step 118 generates a sharpness measure therefrom and provides same to a classification step 120 that evaluates the sharpness of the currently-processed image in terms of it sharpness. Once again, while details of step 120 will be provided further below, it is sufficient at this point to say that step 120 identifies the currently-processed image as SHARP or NOT SHARP.

An image classified as SHARP becomes an outgoing image 200 requiring no additional processing. An image classified as NOT SHARP is sharpened at step 122 in accordance with any one or more image sharpening techniques, a variety of which are well known in the art. For reasons that will become clearer below, the sharpened image from step 122 has a contrast measure associated therewith computed at step 124. This computation is the same as that used in steps 102 and 112. The sharpened image is provided to step 124 where a new contrast measure is computed. This computation is the same as that used in steps 102 and 112. Classification step 120 is then repeated using the new sharpness measure (step 118) and contrast measure (step 124) computed for the sharpened image.

When testing the present invention, it was discovered that the sharpening "loop" does not provide image improvements after a few passes. Accordingly, classification step 120 can include a counter operation to limit the number of passes therethrough thereby preventing "infinite loop" processing. In this case, outgoing image 200 could also be defined by a sharpened image that is still classified as NOT SHARP by the criteria embodied in step 120. By making classification step 120 a "count-limited" classification step, the processing method will be guaranteed to generate outgoing image 200 with efficiency.

The various "measure" computations and turbid image detection/processing will now be described. It will be assumed that the image being evaluated has multiple spectral channels (e.g., colors, bands, etc.). Contrast and lightness measures are determined in the following fashion. The image being evaluated is divided evenly into "R" non-overlapping blocks or regions. For each j-th spectral channel of each k-th region, the mean and standard deviation are determined. Then, the maximum spectral mean and maximum spectral standard deviation are selected for further processing. That is, for each k-th region, the mean $\mu_k$ selected for further processing is $$\mu_k = \max(\mu_j), j=1,\ldots,J \qquad (1)$$

and the standard deviation $\sigma_k$ selected for further processing is $$\sigma_k = \max(\sigma_j), j=1,\ldots,J \qquad (2)$$

where J is the number of spectral channels. Thus, $\mu_k$ and $\sigma_k$ are indicative of perceived lightness and contrast, respectively, of the image.

The next step in determining the contrast measure C is to classify each k-th region as having good or poor contrast. A region's contrast is good when $$\sigma_k \geq K_1 \tag{3}$$

where $K_1$ is a predetermined canonical value. The contrast measure C is the number of regions having good contrast divided by the total number of regions R. The first step in determining the lightness measure L is to determine which regions having poor contrast have good lightness. A region's lightness is good when $$\mu_k \geq K_2 \tag{4}$$

where $K_2$ is a predetermined threshold value. The lightness measure L is the number of regions satisfying equation (4) divided by the total number of regions R.

Contrast and lightness classification steps 108 and 114 perform a merged contrast/lightness classification in accordance with the following logic:

$$\text{If } C \geq K_3 \text{ AND } (C+L) \geq K_4, \tag{5}$$

then classify the image as having GOOD lightness and contrast; else, classify the image having POOR lightness and contrast.

Here, the constants $K_3$ and $K_4$ are predetermined via experimentation.

The sharpness measure computation begins by convolving the image (provided to step 118) with a smallest Difference-of-Gaussian kernel in accordance with methods disclosed by D. Jobson in "Spatial Vision Procession: From the Optical Image to the Symbolic Structures of Contour Information," NASA Technical Paper No. 2838, November, 1988, and F. Huck et al. in "Visual Communication: An Information Theory Approach," Kluwer Academic Publishers, 1997, p. 145. The resulting matrix of image pixels S(x,y) is then half-rectified to identify a matrix S' (x,y) of all non-negative-intensity-value pixels or $$S'(x,y)=S(x,y) \geq 0 \tag{6}$$

Next, each non-negative-intensity-value pixel S'(x,y) is classified as SHARP or NOT SHARP in accordance with the following relationship:

$$\text{If } S'(x,y) \geq K_5, \tag{7}$$

then classify the pixel at (x,y) as SHARP; else, classify the pixel at (x,y) as UNSHARP.

Here, the constant $K_5$ is an experimentally determined canonical constant. The total number of pixels classified as SHARP for an image is counted and is designated herein as "$S_p$". The raw global sharpness measure "S" is the number of sharp pixels of $S_p$ divided by the total number of pixels in the image.

Sharpness classification step 120 uses the sharpness measure S to classify an entire image as SHARP or NOT SHARP in accordance with the logic $$\text{If } S \geq T, \tag{8}$$

then classify the image SHARP; else, classify the image as NOT SHARP.

Here, T is an experimentally determined threshold of the form $$T=(C/C_T)K_6 \tag{9}$$

where C is the contrast measure (from step 102, step 112, or step 124), $C_T$ is a canonical constant determined For minimum GOOD contrast scoring images, and $K_6$ is an experimentally-determined constant.

Figure 2:
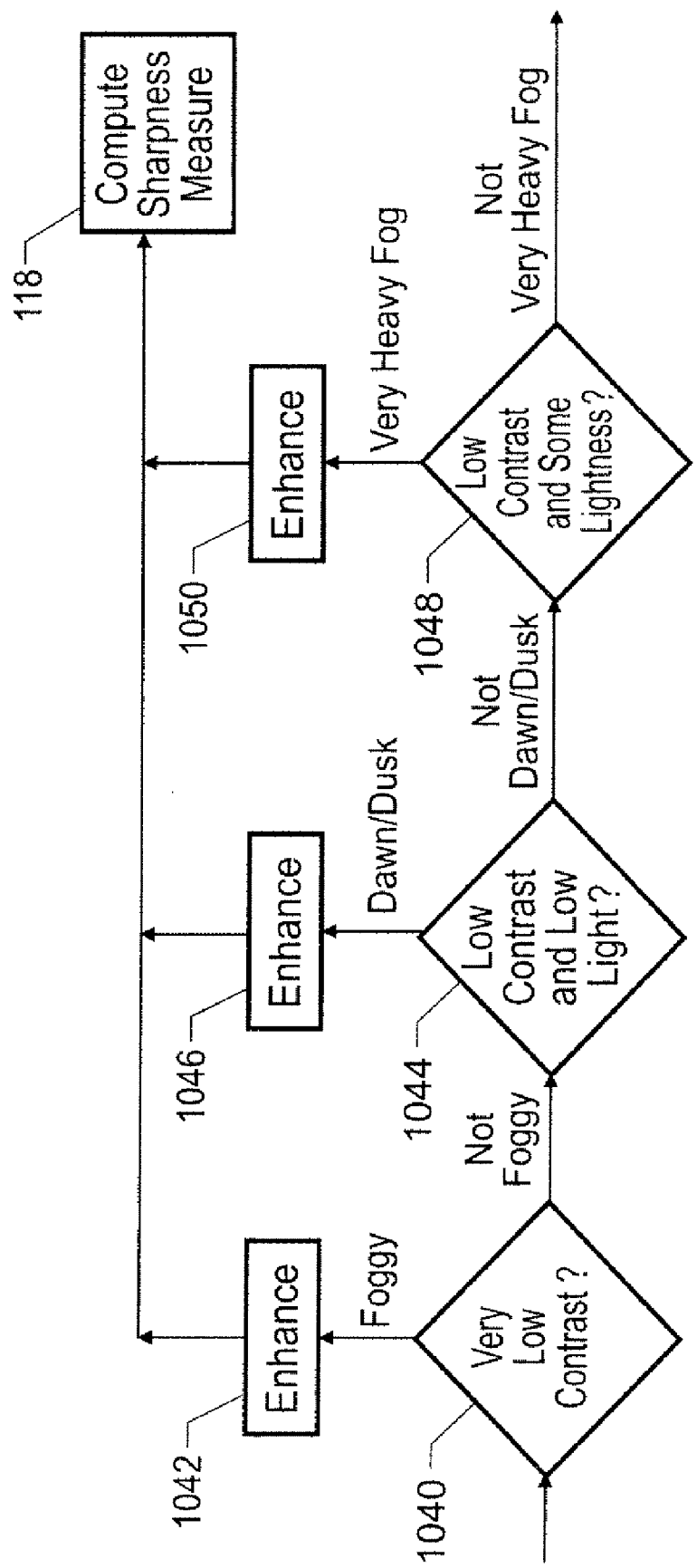
FIG. 2 is a flow diagram of turbid image detection and enhancement processing in accordance with an embodiment of the present invention.
Figure 3:
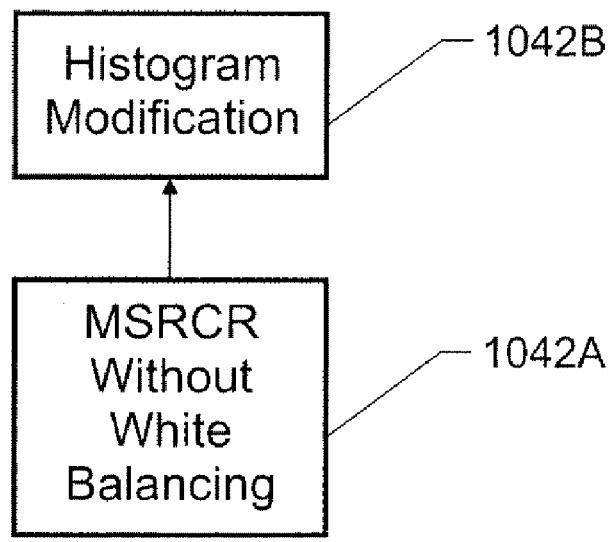
FIG. 3 is a flow diagram of an embodiment of image enhancement for a low-contrast imaging environment.
Figure 4:
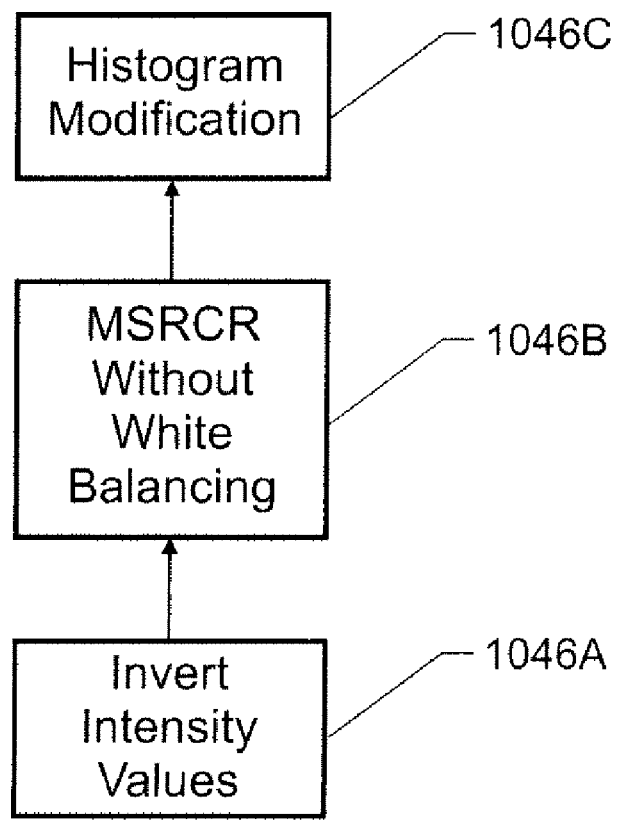
FIG. 4 is a flow diagram of an embodiment of image enhancement for a low-contrast and low-light imaging environment.

Turbid image detection and processing in accordance with the present invention will now be described with reference to FIGS. 2-4. Referring first to FIG. 2, the original image 100 is evaluated at step 1040 to determine if very low contrast conditions exist across the entire image. Such conditions are indicative of a foggy or smoky environment. More specifically, step 1040 compares the sum of the regional standard deviations $\mu_K$ (from equation (1)) to a predetermined threshold value $K_7$ according to the following relationship $$\text{If } \sum_{k=1}^{R} \sigma_k \leq K_7, \tag{10}$$

then the original image is FOGGY; else, the image is NOT FOGGY.

If the original image 100 is FOGGY, it is enhanced in step 1042. For example, step 1042 can be realized by the process illustrated in FIG. 3 where the original image 100 is first processed at step 1042A in accordance with a modified retinex process. That is, the modified retinex process is deadened by the processing techniques disclosed in just two of the previously-cited U.S. patents (i.e., U.S. Pat. Nos. 5,991,456 and 6,834,125). Thus, step 1042A can be said to employ an MSRCR process with the white balancing operation (i.e., disclosed in U.S. Pat. No. 6,842,543) turned off. In foggy images, the brightness is high. Therefore, the original foggy image tends to overwhelm the white balance operation in a full MSRCR process. To counteract this, the white balance operation is turned off in order to allow the retinex processing to impact the original image. The enhanced FOGGY image is further processed by a conventional histogram modification at step 1042B.

Referring again to FIG. 2, if the original image 100 is determined to be NOT FOGGY, it is then checked at step 1044 for the combination of low contrast and low light conditions that would typically exist at either dawn or dusk. Note that dawn and dusk are the times of day when humans experience the greatest visibility deficiency due to the prevalence of blue light. Specifically, step 1044 performs the following logic using the contrast C and lightness measure L from step 102 as follows:

$$\text{If } (C<K_9) \text{ AND } (L<K_{10}), \tag{11}$$

then a DAWN/DUSK condition exists; else, NOT DAWN/DUSK. Here, $K_9$ is a preset contrast measure threshold and $K_{10}$ is a preset lightness measure threshold indicative of dawn/dusk conditions.

If a DAWN/DUSK condition is indicated, the original image 100 is enhanced at step 1046. For example, step 1046 can be realized by the process illustrated in FIG. 4 where the original image 100 first has its pixel intensity values inverted at step 1046A. The inverted-value image is then enhanced at step 1046B by an MSRCR process with the white balancing operations turned off, i.e., the same as process step 1042A. The pixel intensity values are inverted prior to MSRCR processing to allow the log operator (in the MSRCR process) to accentuate the details in the bright regions of the image. The enhanced DAWN/DUSK image is further processed by a conventional histogram modification at step 1046C.

Referring again to FIG. 2, if the original image 100 is determined to be not DAWN/DUSK, it is then checked at step 1048 for the combination of low contrast with light conditions that are bright enough to not trigger DAWN/DUSK, but too dark for adequate handling by enhancement step 1042. This condition would typically exist when there is very heavy fog or haze in daylight. Specifically, step 1048 performs the following logic using the contrast measure C and lightness measure L from step 102 as follows:

$$\text{If } (C<K_9) \text{ AND } (L \leq K_{11}), \quad (12)$$

then VERY HEAVY FOG condition exists; else, NOT VERY HEAVY FOG.

Here, $K_{11}$ is a preset lightness measure value satisfying $K_{10} < L \leq K_{11}$.

If the original image 100 is VERY HEAVY FOG, it is enhanced at step 1050 which can be realized by the same "MSRCR-with-white-balancing-turned-off" process described above, followed by a conventional histogram modification (i.e., the same enhancement combination as process steps 1042A and 1042B). However, in this case, a different set of canonical gain and offset values is used with the "MSRCR-with-white-balancing-turned-off" process to compensate for the additional poor lightness and contrast. If a NOT VERY HEAVY FOG condition exists, the original image 100 is passed to step 108 for processing as described earlier herein. If any of the turbid image detection/processing produces an enhanced image, that enhanced image is provided to sharpness measure computation step 118.

The advantages of the present invention are numerous. A wide variety of image environment conditions are evaluated with the optimum image enhancement processes) being selected/implemented to optimize image contrast, lightness and sharpness. The process provides for variations in visual preferences by selection of threshold constants used throughout the process. Tests of the present invention on a wide variety of imaging conditions have yielded pattern constancy across the various conditions. In terms of image processing systems/methods, "pattern constancy" refers to a system/method's ability to extract a pattern from the image of a scene that is stable over wide ranging extraneous variations in scene lighting conditions, atmospheric turbidity, and exposure errors present in the image acquisition device. Thus, the present invention would be particularly useful in aviation to provide a pilot with (i) good and consistent images regardless of the visibility conditions, and (ii) stable pattern information for use in in-flight computer pattern processing and pattern recognition systems.

Although the invention has been described relative to a specific embodiment thereof, there are numerous variations and modifications that will be readily apparent to those skilled in the art in light of the above teachings. While the present invention provides an automatic "poor" image detection/enhancement process, aspects of the present invention could be used by themselves. For example, the novel contrast, lightness and/or sharpness measures could be utilized in other image classification/processing schemes. The turbid image detection and/or enhancement schemes could be used in a "stand alone" fashion. For example, the FOGGY/NOT FOGGY detection scheme could be used for aviation and underwater imaging to provide a warning or announcement that poor visibility conditions are approaching. It is therefore to be understood that, within the scope of the appended claims, the invention may be practiced other than as specifically described.

What is claimed as new and desired to be secured by Letters Patent of the United States is:

1. A method of image processing, comprising the steps of:
providing a digital image;
dividing said digital image into non-overlapping regions;
computing a standard deviation for each spectral channel of each off said regions wherein a plurality of standard deviations are computed for each of said regions, and wherein a regional standard deviation is defined for each of said regions by a maximum of said plurality of standard deviations associated therewith;
classifying each of said regions as having one of a good contrast score and a poor contrast score based on said regional standard deviation associated therewith, wherein said contrast measure is defined by a ratio of said regions having said good contrast score relative to a total number of said regions in said digital image;
computing a mean for each spectral channel of said regions having a poor contrast score wherein a plurality of means are computed, and wherein a regional mean is defined for each of said regions having a poor contrast score by a maximum of said plurality of means associated therewith;
classifying each of said regions having poor contrast score as having one of a good lightness score and a poor lightness score based on said regional mean associated therewith, wherein said lightness measure is defined by a ratio of said regions having said good lightness score relative to a total number of said regions in said digital image;
classifying said digital image as being one of non-turbid and turbid based on at least said contrast measure, wherein said digital image is respectively identified as being one of a non-turbid image and a turbid image;
enhancing said turbid image, wherein a first enhanced image is generated;
classifying said non-turbid image as having one of a good contrast/lightness score and a poor contrast/lightness score based on said contrast measure and said lightness measure;
enhancing said non-turbid image when said poor contrast/lightness score is associated therewith, wherein a second enhanced image is generated;
computing a revised contrast measure and a revised lightness measure for said second enhanced image;
classifying said second enhanced image as having one of a good contrast lightness score and a poor contrast/lightness score based on said revised contrast measure and said revised lightness measure;
enhancing said second enhanced image when said poor contrast/lightness score is associated therewith, wherein a third enhanced image is generated;
computing a sharpness measure for one image selected from the group consisting of (i) said non-turbid image, (ii) said first enhanced image, (iii) said second enhanced image when said good contrast/lightness score is associated therewith, and (iv) said third enhanced image;
classifying said one image as having one of a sharp image score and a not-sharp image score based on said sharpness measure;
sharpening said one image when said not-sharp score is associated therewith, wherein a sharpened image is generated;
computing a contrast measure and a revised sharpness measure for said sharpened image; and
classifying said sharpened image as having one of a sharp image score and a not-sharp image score based on said contrast measure associated with said sharpened image, wherein a final image is selected from the group consisting of (i) said one image having said sharp image score, (ii) said sharpened image having said sharp image score, and (iii) said sharpened image having said not-sharp image score.

2. A method according to claim 1, wherein a plurality of regional standard deviations are defined for said digital image, and wherein said step of classifying said digital image includes the step of comparing a sum of said plurality of regional standard deviations to a threshold in order to classify said digital image as being one of non-turbid and turbid.

3. A method according to claim 1, wherein said step of classifying said digital image includes the steps of:
   comparing said contrast measure to a first threshold; and
   comparing said lightness measure to a second threshold and a third threshold, said second threshold being less than said third threshold, wherein a first turbid classification is defined when said contrast measure is less than said first threshold and said lightness measure is less than said second threshold, and wherein a second turbid classification is defined when said contrast measure is less than said first threshold and said lightness measure is greater than said second threshold but less than said third threshold.

4. A method according to claim 3 wherein, when said first turbid classification is defined, said method further comprises the step of inverting intensity values associated with said turbid image prior to said step of enhancing said turbid image.

5. A method according to claim 1, wherein said step of computing said sharpness measure comprises the steps of:
   convolving said one image with a smallest Difference-of-Gaussian kernel to generate a sharpness image;
   identifying non-negative-intensity pixels in said sharpness image; and
   classifying each of said non-negative-intensity pixels as being one of sharp and not-sharp based on a comparison of each of said non-negative-intensity pixels to a predetermined constants wherein said sharpness measure is defined by a ratio of a number of said non-negative-intensity pixels so-classified as sharp to a total number of pixels in said digital image.

6. A method according to claim 5, wherein said step of identifying comprises the step of half-rectifying said sharpness image.

7. A method according to claim 1, wherein said step of enhancing said non-turbid image comprises the step of applying a multi-scale-retinex-with-color-restoration process to said non-turbid image.

8. A method according to claim 1, wherein said step of enhancing said second enhanced image comprises the step of applying a histogram operation to said second enhanced image.

9. A method according to claim 1, wherein said step of enhancing said turbid image includes the step of applying a multi-scale-retinex-with-color-restoration-and-without-white-balancing process to said turbid image.

* * * * *